United States Patent
Li et al.

(10) Patent No.: US 9,552,054 B2
(45) Date of Patent: Jan. 24, 2017

(54) METHOD FOR CONTROLLING SENSOR

(71) Applicant: Quanta Computer Inc., Taoyuan Shien (TW)

(72) Inventors: Chi-Li Li, Taoyuan Shien (TW); Yuan-Chih Yeh, Yunlin County (TW); Chun-Hao Lien, Taoyuan Shien (TW)

(73) Assignee: QUANTA COMPUTER INC., Taoyuan (TW)

( * ) Notice: Subject to any disclaimer, the term of this patent is extended or adjusted under 35 U.S.C. 154(b) by 125 days.

(21) Appl. No.: 14/526,978

(22) Filed: Oct. 29, 2014

(65) Prior Publication Data

US 2016/0026235 A1 Jan. 28, 2016

(30) Foreign Application Priority Data

Jul. 25, 2014 (TW) .............................. 103125559 A

(51) Int. Cl.
| | | |
|---|---|---|
| *G06F 3/041* | (2006.01) | |
| *G06F 1/32* | (2006.01) | |
| *G06F 1/28* | (2006.01) | |

(52) U.S. Cl.
CPC ............... *G06F 1/3296* (2013.01); *G06F 1/28* (2013.01); *G06F 3/0416* (2013.01)

(58) Field of Classification Search
CPC ..................... G06F 2203/04106; G06F 3/0416; G06F 3/017; G06F 2203/04104
See application file for complete search history.

(56) References Cited

U.S. PATENT DOCUMENTS

| | | | |
|---|---|---|---|
| 7,447,526 B2 | 11/2008 | Kim et al. | |
| 9,113,125 B2* | 8/2015 | Avrahami | ......... G06F 17/30817 |
| 2010/0033424 A1* | 2/2010 | Kabasawa | ............... G01C 17/28 |
| | | | 345/156 |
| 2010/0313050 A1* | 12/2010 | Harrat | ................... G06F 1/3203 |
| | | | 713/323 |
| 2013/0091369 A1* | 4/2013 | Shih | ........................ G06F 1/325 |
| | | | 713/323 |

FOREIGN PATENT DOCUMENTS

| | | |
|---|---|---|
| CN | 102034456 A | 4/2011 |
| TW | I373708 B | 10/2012 |

* cited by examiner

*Primary Examiner* — Mohammed Rehman
*Assistant Examiner* — Alyaa T Mazyad
(74) *Attorney, Agent, or Firm* — Rabin & Berdo, P.C.

(57) ABSTRACT

A method for controlling a sensor includes steps of: sensing an object for determining whether the object is within a sensing range of the sensor; if it is determined that the object is not within the sensing range, the sensor is turned into a non-active mode for a predicted non-active time, wherein the predicted non-active time is calculated based on a predetermined or a historical non-active time; sensing the object for determining whether the object is within the sensing range during the predicted non-active time; and if it is determined that the object is not within the sensing range during the predicted non-active time, the sensor is turned into a sleep mode for an predicted sleep time, wherein the predicted sleep time is calculated based on the predetermined non-active time and a predetermined sleep time, or is calculated based on the historical non-active time and a historical sleep time.

5 Claims, 4 Drawing Sheets

METHOD FOR CONTROLLING SENSOR

RELATED APPLICATIONS

This application claims priority to Taiwan Application Serial Number 103125559, filed Jul. 25, 2014, which is herein incorporated by reference.

BACKGROUND

Field of Invention

The present invention relates to a method for controlling an electrical device. More particularly, the present invention relates to a method for controlling a sensor.

Description of Related Art

With the progression of technology, sizes of portable electrical devices become slimmer and lighter, so does the size of batteries in portable electrical devices, which limits the capacity of the battery. On the other hand, customers prefer to have portable electrical devices with the longer service time such that they can work or play with the portable electrical devices for a longer time when unplugged.

In view of the above, how to decrease power consumption of the portable electrical devices for extending service time of the portable electrical devices so as to attract customers has become the priority of manufacturers.

SUMMARY

The following summary presents a simplified summary of the disclosure in order to provide a basic understanding to the reader. This summary is not an extensive overview of the disclosure and it does not identify key/critical elements of the present invention or delineate the scope of the present invention.

One aspect of the present disclosure is directed to a method for controlling a sensor. The method for controlling a sensor comprises the steps of: (a) sensing an object for determining that whether the object is within a sensing range of the sensor by the sensor; (b) if it is determined that the object is not within the sensing range, the sensor is turned into a non-active mode for a predicted non-active time, wherein the predicted non-active time is calculated based on a predetermined non-active time or a historical non-active time; (c) sensing the object for determining that whether the object is within the sensing range of the sensor during the predicted non-active time; and (d) if it is determined that the object is not within the sensing range during the predicted non-active time, the sensor is turned into a sleep mode for an predicted sleep time, wherein the predicted sleep time is calculated based on the predetermined non-active time and a predetermined sleep time, or the predicted sleep time is calculated based on the historical non-active time and a historical sleep time.

In view of the foregoing, embodiments of the present disclosure provide a method for controlling a sensor to decrease power consumption of portable electrical devices for prolonging service time of portable electrical devices.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows.

Figure 1:
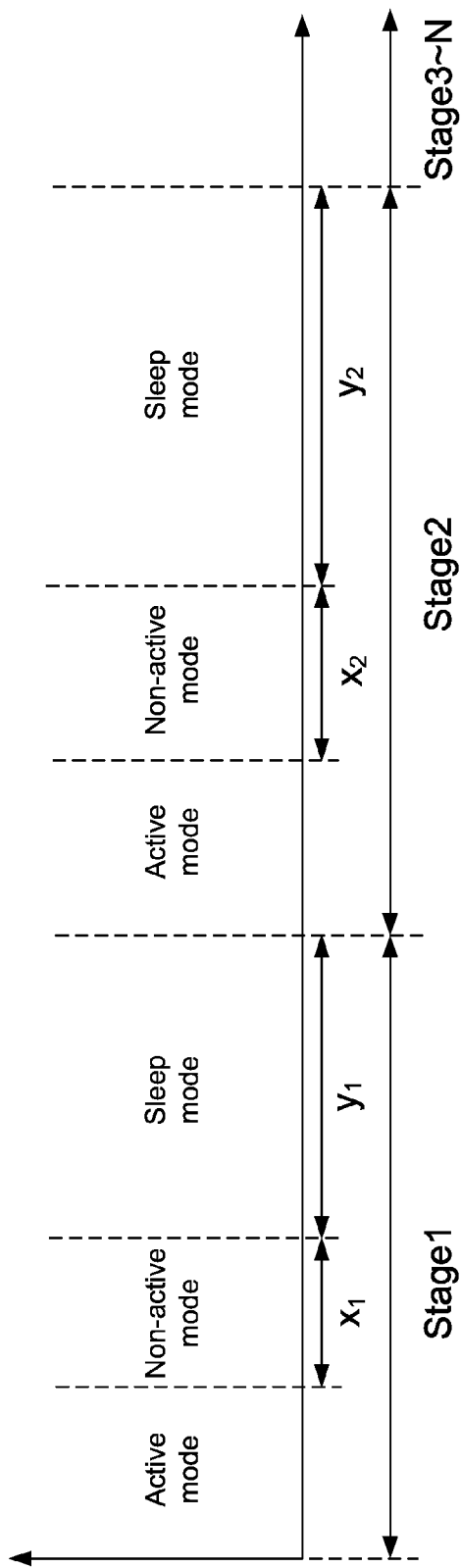
FIG. 1 is a timing diagram of a method for controlling a sensor according to embodiments of the present invention.

In accordance with common practice, the various described features/elements are not drawn to scale but instead are drawn to best illustrate specific features/elements relevant to the present invention. Also, wherever possible, like or the same reference numerals are used in the drawings and the description to refer to the same or like parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Service time of portable electrical devices is related to power consumption of portable electrical devices. For decreasing power consumption of portable electrical devices, the present invention provides a method for controlling a sensor so as to control a sensor which is employed in a portable electrical device for achieving the goal of saving power efficiently. The technical features of the present invention are described in detail as below.

FIG. 1 is a timing diagram of a method for controlling a sensor according to embodiments of the present invention. As shown in FIG. 1, the method for controlling a sensor has many control modes such as an active mode, a non-active mode, and a sleep mode. The foregoing modes represent operation conditions of the sensor. If the sensor works normally to sense gestures of users, the sensor is defined in the active mode. If the sensor does not sense any gesture of users in the active mode, the sensor is turned into the non-active mode. Finally, if the sensor is in a resting condition, the sensor is defined in the foregoing sleep mode. When the sensor is in the sleep mode, power consumption thereof is lower.

In one embodiment of the present invention, the sensor can be but not limited to a gesture integrated circuit (IC). In addition, the sensor may have a sleep mode/a power saving mode; otherwise, the sensor can be a sensor which does not have a sleep mode/a power saving mode, but can be adjusted via hardware together with the method for controlling a sensor so as to achieve the goal of saving power. However, the scope of the present application is not intended to be limited to the embodiments. Such embodiment is merely used for exemplary purpose.

After understanding the meaning of each mode of the sensor, the operations of the method for controlling the sensor will be explained with the timing diagram in FIG. 1. Firstly, referring to Stage1 as shown in FIG. 1, it is assumed that the sensor is in the active mode at the beginning, or the sensor is keeps sensing due to having sensing a gesture of a user in its sensing range. Subsequently, if the sensor does not sense any gesture of a user in its sensing range, the sensor is turned into the non-active mode; meanwhile, the sensor starts to count a time duration of the non-active mode for determining that whether the duration lasts for a non-active time $x_1$.

It is noted that the sensor can still sense any gesture of a user in the non-active mode. Hence, the method for sensing a sensor can determine that whether the object is within the sensing range of the sensor during the non-active time $x_1$ based on the sensed result. If it is determined that the object is not within the sensing range of the sensor during the non-active time $x_1$, the sensor is turned into the sleep mode; meanwhile, the sensor starts to count a time duration of the sleep mode for determining that whether the duration lasts for a sleep time $y_1$. Once the sensor is turned into the sleep mode, power consumption of the sensor can be reduced. It is noted that the sensor can still sense any gesture of a user even in the sleep mode. The difference is that the sensing frequency or sensing number of times of the sensor per second decreases when the sensor is in the sleep mode, such that power consumption of the sensor is reduced. Accordingly, the sensor is not sensitive or cannot react immediately in the sleep mode. However, the sensor can still sense an object for determining that whether the object is within its sensing range during the sleep time $y_1$ based on the sensed result.

If it is determined that the object is within the sensing range of the sensor during the sleep time $y_1$, the sensor is turned from the sleep mode into the active mode for providing a much sensitively and immediately detected result. If the sensor doesn't sense any object within its sensing range during the sleep time $y_1$, the sensor it turned into the active mode of Stage2, such that the sensor can still sense an object sensitively and immediately for providing a detected result. Although there is a delay time for the sensor to change from the sleep mode into the active mode, the present invention can provide a solution to balance "the purpose of saving power" and "the purpose of sensing sensitively and immediately" to improve the delay condition. The improving way is to turn the mode of the sensor from the sleep mode into the active mode if the sensor does not sense any object within its sensing range in the sleep time $y_1$. Explained in a different way, if the present invention does not provide the foregoing improving way (turning the mode of the sensor from the sleep mode into the active mode even if no object is sensed), once the sensor is in the sleep mode, the sensor can be turned into the active mode only when the sensor does sense an object within its sensing range. That is to say, users should wait the delay time for the sensor to turn from the sleep mode into the active mode to have better sense ability.

The Stage1 can be a basic period of the method for controlling a sensor of the present invention. Explained in a different way, the basic operation of the method can be understood via the foregoing operations in Stage1. Subsequently, the next basic period Stage2 will be described below.

Reference is now made to Stage2 as shown in FIG. 1. Basically, after the sensor is turned into the active mode of Stage2, the steps of the method for controlling a sensor of the present invention in Stage 2 is similar to the steps of the method in Stage1. Of the active mode of Stage2, the sensor is used to sense whether the object is within the sensing range of the sensor. If it is determined that the sensor does not sense any object within the sensing range, the sensor is turned into the non-active mode; meanwhile, the sensor starts to count a time duration of the non-active mode for determining that whether the duration lasts for a non-active time $x_2$.

If it is determined that the non-active mode lasts for the non-active time $x_2$ (that is to say, the sensor does not sense any object within the sensing range during the non-active time $x_2$), the sensor is turned into the sleep mode; meanwhile, the sensor starts to count a time duration of the sleep mode for determining that whether the duration lasts for a sleep time $y_2$ for achieving the goal of saving power. Subsequently, in the following stages, for example, Stage3 to StageN, the embodiment of the present invention can perform the method for controlling a sensor continuously based on the basic period as shown above.

Besides controlling the sensor according to the above description, the embodiment of the present invention adaptively adjusts the non-active time and the sleep time based on operation conditions of the user. As such, the power of the sensor can be saved further, and the embodiment of the present invention can provide a custom power saving mode for users based on the operation habit or operation condition of each users. The custom power saving mode will be described below.

As can be seen in Stage2, it is assumed that users has shown the operation habit in Stage1, for example, the non-active time $x_1$ is obtained by counting the actual non-active time (the counting way will be described in detailed below). Besides, the sleep time $y_1$ is obtained by counting the actual sleep time (the counting way will be described in detailed below). Hence, the method for controlling a sensor of the embodiment of the present invention can calculate the non-active time $x_2$ based on the non-active time $x_1$. The foregoing non-active time $x_2$ is a predicted non-active time which is calculated based on the former. So called predicted non-active time represents a non-active time which is predicted based on the former operations habit of users. For instance, if the trend of the operations condition is that the real non-active time increases, the predicted non-active time will increase correspondingly. On the contrary, if the trend of the operations condition is that the real non-active time decreases, the predicted non-active time will decrease correspondingly.

Similarly, the sleep time $y_2$ can be calculated based on the sleep time $y_1$ or based on both of the non-active time $x_1$ and the sleep time $y_1$. The sleep time $y_2$ is a predicted sleep time which is predicted based on the former non-active time $x_1$ and the former sleep time $y_1$. As such, the method for controlling a sensor of the embodiment of the present invention can adaptively predict the next non-active time and the next sleep time based on the historical or current stages, and further provides a custom power saving mode for users based on the custom of each users.

Figure 2:
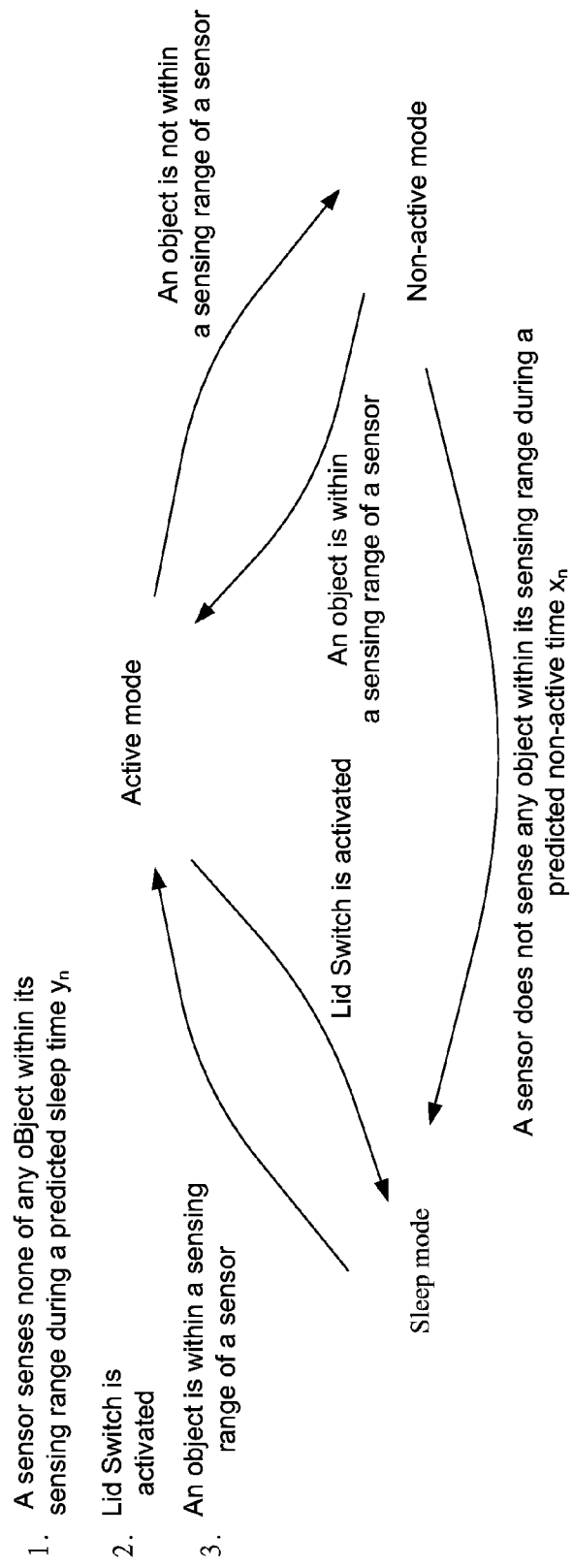
FIG. 2 is a relation diagram of operation modes of a method for controlling a sensor according to embodiments of the present invention.

FIG. 2 is a relation diagram of operation modes of a method for controlling a sensor according to embodiments of the present invention. The relation diagram of operation modes in FIG. 2 is used to describe the relation among the operation modes.

As shown in FIG. 2, reference is now made to "active mode" of a sensor. If the sensor is in the active mode but does not sense any object within its sensing range (for example, the sensor does not sense gestures of users);

meanwhile, the sensor will be turned into the non-active mode. In one embodiment, the sensor can be employed in a portable device, for example, the sensor can be employed in a notebook. Since the notebook can further employ a Lid Switch, if the Lid Switch is activated (for example, the notebook changes its state from open to close so as to press the Lid Switch), it represents that the user does not have to use the notebook; meanwhile, the sensor is turned into the sleep mode.

Reference is now made to "non-active mode" of the sensor as shown in FIG. 2. If the sensor is in the non-active mode and does not sense any object within its sensing range during the predicted non-active time $x_n$ (for example, the sensor does not sense any gesture of a user), the sensor is turned into the sleep mode. On the other hand, if the sensor senses any object within its sensing range during the predicted non-active time $x_n$, the sensor is turned into the active mode.

Moreover, reference is now made to "sleep mode" of the sensor as shown in FIG. 2. If the sensor is in the sleep mode and does not sense any object within its sensing range during the predicted sleep time $y_n$ (for example, the sensor does not sense any gesture of a user), the sensor is turned into the active mode. In addition, if the sensor senses any object within its sensing range during the predicted sleep time $y_n$, the sensor is also turned into the active mode. In one embodiment, if the Lid Switch is activated (for example, a notebook changes its state from close to open so as to release the Lid Switch), it represents that a user has to use a notebook; meanwhile, the sensor is turned into the active mode. However, the present is not intended to be limited to the embodiment of FIG. 2. The embodiment of FIG. 2 is merely used for illustrative purposes.

Figure 3:
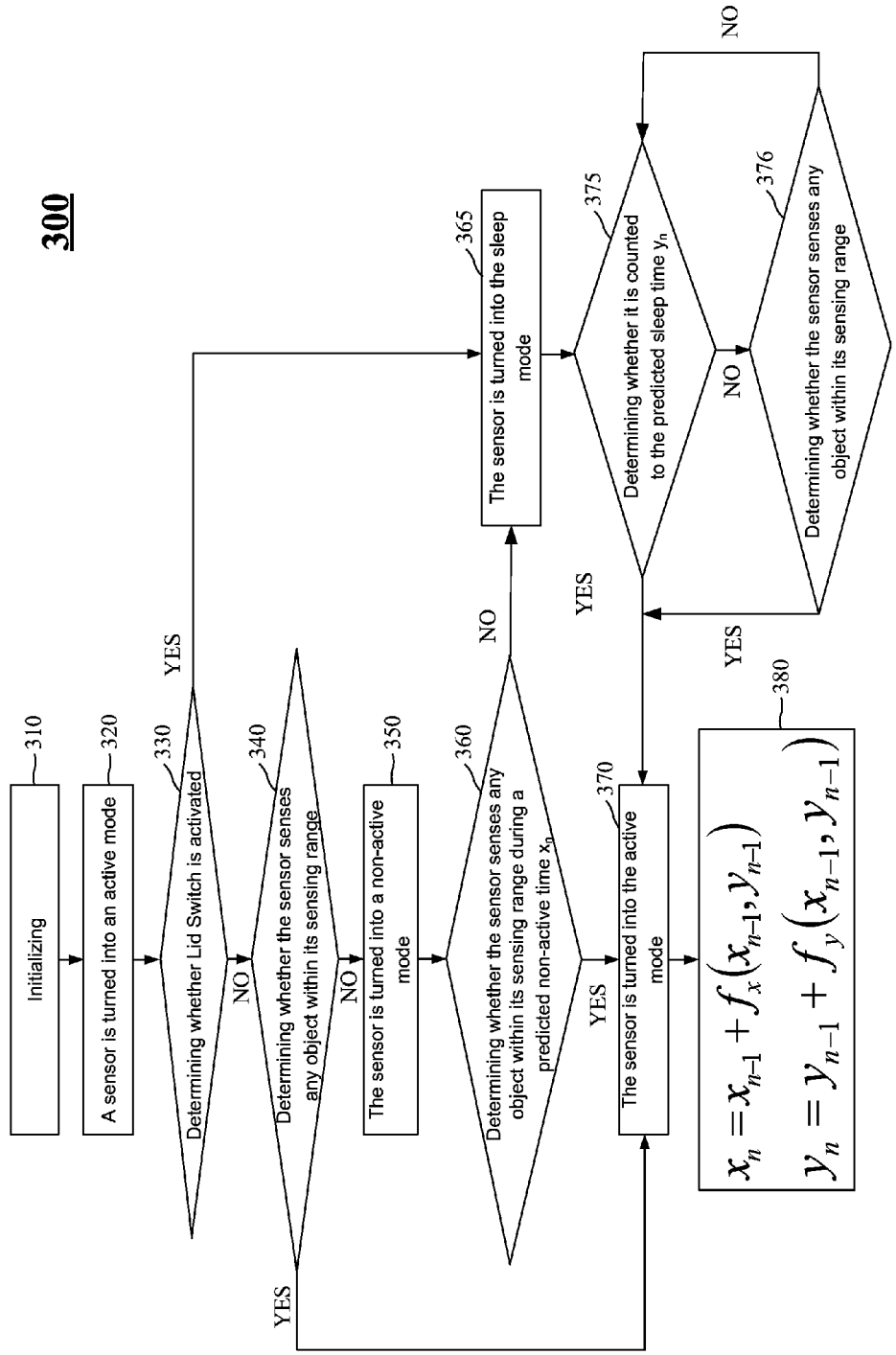
FIG. 3 is a flow diagram illustrating process steps of a method for controlling a sensor according to embodiments of the present disclosure.

For facilitating the understanding of the method for controlling a sensor of the present invention, the embodiment of the present invention further provides FIG. 3 for illustrating such method 300. FIG. 3 is a flow diagram illustrating process steps of the method 300 for controlling a sensor according to embodiments of the present disclosure.

As can be seen in FIG. 3, the sensor is initialized firstly in step 310. Subsequently, the sensor is turned into an active mode in step 320. Next, referring to the optional step 330, since the sensor can be employed in the notebook which has Lid Switch, which may be determined whether being activated or not in step 330. For example, if a user does not have to use a notebook and close it, the Lid Switch will be activated or pressed (for example, the Lid Switch is turned from open to close).

Assuming that the Lid Switch is not activated via the step 330, it represents that the notebook is still in state of using; meanwhile, the step 340 is performed to determine whether the sensor senses any object within its sensing range. On the other hand, if it is determined that the Lid Switch is activated in step 330, it represents that the user does not have to use the notebook and close it; meanwhile, the step 365 is performed to control the sensor to turn into the sleep mode for achieving the goal of saving power.

Subsequently, reference is now made to the step 340. If the sensor does not sense any object within its sensing range, the step 350 is performed to control the sensor to turn into the non-active mode; meanwhile, the sensor starts to count a time duration of the non-active mode for determining that whether the duration lasts for a predicted non-active time $x_n$.

Subsequently, in step 360, the sensor is in the non-active mode and continuously sense objects. The method 300 for controlling a sensor can determine whether the sensor senses any object within its sensing range during the predicted non-active time $x_n$ based on the sensed result. If it is determined that the sensor senses any object within its sensing range during the predicted non-active time $x_n$ in step 360 (for example, the sensor senses any gesture of a user during the predicted non-active time $x_n$), the step 370 is performed to turn the sensor into the active mode. Meanwhile, the method 300 for controlling a sensor stores a time duration from the beginning of the predicted non-active time $x_n$ to a time point when it is detected that an object is within the sensing range of the sensor; then, the time duration is regarded as the historical non-active time.

As described above, the historical non-active time or the predetermined non-active time can be used to calculate the predicted non-active time $x_n$. The following is an embodiment to describe such calculation of the predicted non-active time $x_n$. The formula of the predicted non-active time $x_n$ is as shown below:

$$x_n = x_{n-1} + \frac{(x_{n-1} - x_{n-2})}{2} \qquad \text{formula 1}$$

In formula 1, $x_n$ is the predicted non-active time, and $x_{n-1}$ and $x_{n-2}$ are the predetermined non-active time or the historical non-active time. It is assumed that the value of the predetermined non-active time $x_1$ of the Stage1 is 30 seconds, and the value of the predetermined non-active time $x_2$ of Stage2 is 50 seconds. The predicted non-active time $x_3$ of Stage3 can be calculated by the foregoing formula 1, and the value of the predicted non-active time $x_3$ is 60 seconds (It is assumed that the predicted non-active time $x_3$ is equal to the predicted non-active time $x_n$ of the step 360). Referring to Table 1 as shown below, it can be seen that the trend of the non-active time of Stage1 and Stage2 is increased via a comparison result of the predetermined non-active time $x_1$ (30 seconds) of Stage1 and the predetermined non-active time $x_2$ (50 seconds) of Stage2. Hence, the trend of the non-active time of Stage2 and Stage3 is also increased via a comparison result of the predetermined non-active time $x_2$ (50 seconds) of Stage2 and the predetermined non-active time $x_3$ (60 seconds) of Stage3.

Besides, it is assumed that the value of the non-active time $x_3$ of Stage3 obtained by counting the actual non-active time is 40 seconds. The value of the predicted non-active time $x_4$ of Stage4 obtained by the foregoing formula 1 is 35 seconds (the value of $x_2$ is 50 seconds, and the value of $x_3$ is 40 seconds at this time). Referring to Table 1 as shown below, it can be seen that the trend of the non-active time of Stage2 and Stage3 is decreased by a comparison result of the predetermined non-active time $x_2$ (50 seconds) of Stage2 and the non-active time $x_3$ (40 seconds) of Stage3. Hence, the trend of the non-active time of Stage3 and Stage4 is also decreased by a comparison result of the non-active time $x_3$ (40 seconds) of Stage3 and the predicted non-active time $x_4$ (35 seconds) of Stage3.

In addition, it is assumed that the value of the non-active time $x_4$ of Stage4 obtained by counting the actual non-active time is 50 seconds. The value of the predicted non-active time $x_5$ of Stage5 obtained by the foregoing formula 1 is 55 seconds. Referring to Table 1 as shown below, it can be seen that the trend of the non-active time of Stage3 and Stage4 is increased by a comparison result of the non-active time $x_3$ (40 seconds) of Stage3 and the non-active time $x_4$ (50 seconds) of Stage4. Hence, the trend of the non-active time of Stage4 and Stage5 is also increased by a comparison result of the non-active time $x_4$ (50 seconds) of Stage4 and the predicted non-active time $x_5$ (55 seconds) of Stage5.

TABLE 1

Contrast table

|  | Stage1 | Stage2 | Stage3 | Stage4 | Stage5 |
|---|---|---|---|---|---|
| predicted non-active time |  |  | $x_3 = 60$ (s) | $x_4 = 35$ (s) | $x_5 = 55$ (s) |
| predetermined/ actual non-active time | $x_1 = 30$ (s) | $x_2 = 50$ (s) | $x_3 = 40$ (s) | $x_4 = 50$ (s) |  |

To sum up the above-mentioned embodiments, if the trend of the predetermined/actual non-active time is increased, the trend of the predicted non-active time which is predicted based on the predetermined/actual non-active time would be increased also. On the contrary, if the trend of the predetermined/actual non-active time is decreased, the trend of the predicted non-active time is also decreased. Therefore, the method 300 for controlling a sensor of the present invention can provide a custom power saving mode for users based on the custom of each users.

On the contrary, if it is determined that the sensor does not sense any object within its sensing range during the predicted non-active time $x_n$ via the step 360, the step 365 is performed to turn the sensor into the sleep mode for achieving the goal of saving power. In one embodiment, the step 360 can be performed by a counter.

Even if the sensor is in a sleep mode, the sensor can still sense an object. The method 300 for controlling a sensor can determine that whether the sensor senses any object within its sensing range during the predicted sleep time $y_n$ based on the sensed result. Firstly, the step 375 may perform a counting step to determine that whether it is counted to the end of predicted sleep time $y_n$. If it is counted to the predicted sleep time $y_n$, the sensor is turned into the active mode. If it is not counted to the end of the predicted sleep time $y_n$, the step 376 is performed to determine whether the sensor senses any object within its sensing range. If it is determined that the sensor does not sense any object within its sensing range, the method 300 for controlling a sensor goes back to the step 375. If it is determined that the sensor senses any object within its sensing range (for example, the sensor senses any gesture of a user during the predicted sleep time $y_n$), the step 370 is performed to turn the sensor into the active mode. Meanwhile, the method 300 for controlling a sensor stores a time duration from the beginning of the predicted sleep time $y_n$ to a time point when it is detected that an object is within the sensing range of the sensor; then, the time duration is regarded as the historical sleep time. As described above, the historical sleep time can be used to calculate the predicted sleep time $y_n$. In one embodiment, the step 375 can be performed by a counter.

It is noted that the determination way of the step 376 includes determining that whether the Lid Switch is activated. If the Lid Switch is activated (for example, the notebook changes its state from close to open so as to release the Lid Switch), it represents that a user has to use the notebook; meanwhile, the sensor is turned into the active mode. That is to say, in the step 376, if it is determined that the Lid Switch is activated or the sensor senses any object within its sensing range, the step 370 is performed to turn the sensor into the active mode.

Subsequently, referring to the step 380, the former steps have stored the historical non-active time and the historical sleep time; accordingly, in the step 380, the predicted non-active time $x_n$ can be calculated by the historical non-active time $x_{n-1}$ and $f_x(x_{n-1}, y_{n-1})$. The predicted sleep time $y_n$ can be calculated by the historical sleep time $y_{n-1}$ and $f_y(x_{n-1}, y_{n-1})$. The following is an embodiment to describe such calculation of the predicted non-active time $x_n$ and the predicted sleep time $y_n$. The formula of the predicted non-active time $x_n$ and the predicted sleep time $y_n$ are as shown below:

$$x_n = x_{n-1} + \frac{(x_{n-1} - x_{n-2})}{2} - \frac{x_{n-1}}{3} \quad \text{formula 2}$$

$$x_n = \frac{7}{6}x_{n-1} - \frac{1}{2}x_{n-2} \quad \text{formula 3}$$

$$y_n = (x_{n-1} + y_{n-1}) + \frac{(x_{n-1} + y_{n-1}) - (x_{n-2} + y_{n-2})}{2} - x_n \quad \text{formula 4}$$

$$y_n = \frac{1}{3}x_{n-1} + \frac{3}{2}y_{n-1} - \frac{1}{2}y_{n-2} \quad \text{formula 5}$$

As shown above, compared with formula 1, formula 2 further subtracts a value $$\frac{x_{n-1}}{3}.$$

The value $$\frac{x_{n-1}}{3}$$

is used to fine tune the predicted non-active time $x_n$ for decreasing the predicted non-active time $x_n$. Since users do not make any gesture to activate any operation during the non-active time and the sleep time, the non-active time and the sleep time are regard as a non-work time. Of the whole non-work time, only the sleep time can save power. Hence, as shown in formula 2, if the predicted non-active time $x_n$ is decreased, the ratio of the sleep time in the non-work time can be increased accordingly for increasing the efficiency of saving power. Besides, the formula 3 is obtained by arranging the formula 2. In addition, in the formula 4, $x_n$ is the predicted non-active time, $y_n$ is the predicted sleep time, the $x_{n-1}$ and the $x_{n-2}$ are the predetermined non-active time or the historical non-active time, and the $y_{n-1}$ and the $y_{n-2}$ are the predetermined sleep time or the historical sleep time. In addition, the formula 5 is obtained by arranging the formula 4.

Referring the formula 4, $(x_{n-1}+y_{n-1})$ is the sum of the non-active time and the sleep time; that is call the non-work time above. Besides, $$\frac{(x_{n-1} + y_{n-1}) - (x_{n-2} + y_{n-2})}{2}$$

is a fine tuning value for the predicted sleep time $y_n$ for conforming to the operation condition of users. In addition, the predicted non-active time $x_n$ further subtracts the value $$\frac{x_{n-1}}{3}$$

in the formula 2 for decreasing the predicted non-active time $x_n$; hence, if the predicted sleep time $y_n$ subtracts a smaller predicted non-active time $x_n$ as shown in the formula 2, the predicted sleep time $y_n$ can be increased so as to increase the power saving time for increasing the efficiency of saving power.

The following is an actual example for describing the above-mentioned embodiments. Reference is now made to Table 2. It is assumed that the value of the predetermined non-active time $x_1$ of Stage1 is 5 seconds, and the value of the predetermined sleep time $y_1$ is 5 seconds. It is also assumed that the value of the predetermined non-active time $x_2$ of Stage2 is 7 seconds, and the value of the predetermined sleep time $y_2$ is 7 seconds. The value of the predicted non-active time $x_3$ and the value of the predicted sleep time $y_3$ can be calculated by the formula 5. The value of the predicted non-active time $x_3$ is 5.67 seconds, and the value of the predicted sleep time $y_3$ is 10.33 seconds.

TABLE 2

Contrast table

|  | Stage1 | | Stage2 | | Stage3 | | Stage4 | |
| --- | --- | --- | --- | --- | --- | --- | --- | --- |
|  | $x_1$ | $y_1$ | $x_2$ | $y_2$ | $x_3$ | $y_3$ | $x_4$ | $y_4$ |
| predicted (seconds) |  |  |  |  | 5.67 | 10.33 | 3.5 | 7.5 |
| power saving rate(%) |  |  |  |  | 64.5% | | 68.2% | |
| predetermined/actual (seconds) | 5 | 5 | 7 | 7 | 6 | 6 |  |  |
| power saving rate(%) | 50% | | 50% | | 50% | |  |  |

To analysis the above-mentioned results, the predetermined non-work time of Stage2 (the predetermined non-active time $x_2$ and the predetermined non-sleep time $y_2$) is 14 seconds, and the predetermined sleep time $y_2$ which can save power is 7 seconds. The ratio of the predetermined sleep time $y_2$ and the whole non-work time is 50%, which represents that the power saving rate in the predetermined non-work time of Stage2 is 50%. Besides, the predicted non-work time of Stage3 (the predicted non-active time $x_3$ and the predicted sleep time $y_3$) is 16 seconds, and the predicted sleep time $y_3$ which can save power is 10.33 seconds. The ratio of the predicted sleep time $y_3$ and the whole predicted non-work time is 64.5%, which represents that the power saving rate in the predicted non-work time of Stage3 is 64.5%. As such, since the predicted sleep time $y_3$ (10.33 seconds) is longer than the predicted non-active time $x_3$ (5.67 seconds), the power saving rate increases from 50% of Stage2 to 64.5% of Stage3. Hence, the method 300 for controlling a sensor of the present invention can achieve the goal of saving power. Besides, as shown in Table2, the trend of the non-work time in Table 2 is increased, for example, the non-work time of Stage1 is 10, the non-work time of Stage2 is 14, and the predicted non-work time of Stage3 is 16. In view of above, the predicted non-work time changes based on operations of users to provide custom power saving mode for users.

Based on the above-mentioned examples, please refer to Table 2, it is assumed that the actual non-active time $x_3$ of Stage3 obtained by counting the actual non-active time is 6 seconds, and the actual sleep time $y_3$ of Stage3 obtained by counting the actual sleep time is 6 seconds. The value of the predicted non-active time $x_4$ and the value of the predicted sleep time $y_4$ of Stage4 can be calculated by the formula 5. The value of the predicted non-active time $x_4$ is 3.5 seconds, and the value of the predicted sleep time $y_4$ is 7.5 seconds.

To sum up the above-mentioned results, referring to Table 2, the actual non-work time of Stage3 (the actual non-active time $x_3$ and the actual non-sleep time $y_3$) is 12 seconds, and the actual sleep time $y_3$ which can save power is 6 seconds. The ratio of the actual sleep time $y_3$ and the whole non-work time is 50%, which represents that the power saving rate in the actual non-work time of Stage3 is 50%. Besides, the predicted non-work time of Stage4 (the predicted non-active time $x_4$ and the predicted sleep time $y_4$) is 11 seconds, and the predicted sleep time $y_4$ which can save power is 7.5 seconds. The ratio of the predicted sleep time $y_4$ and the whole predicted non-work time is 68.2%, which represents that the power saving rate in the predicted non-work time of Stage4 is 68.2%. As such, the power saving rate increases from 50% of Stage3 to 68.2% of Stage4. Hence, the method 300 for controlling a sensor of the present invention can achieve the goal of saving power. Besides, as shown in Table2, the trend of the non-work time in Table 2 is increased, for example, the predetermined non-work time of Stage2 is 14, the actual non-work time of Stage3 is 12, and the predicted non-work time of Stage4 is 11. In view of above, the predicted non-work time changes based on operation habit of users to provide custom power saving mode for users. However, the scope of the present application is not intended to be limited to the embodiment of FIG. 3. Such embodiment is merely used for exemplary purpose.

In one embodiment, the step 330 could be performed anytime among the step 340 to the step 380; that is to say, once it is determined that users do not need to use notebooks and close notebooks, the step 365 is performed to turn the sensor into the sleep mode for achieving the goal of saving power.

Figure 4:
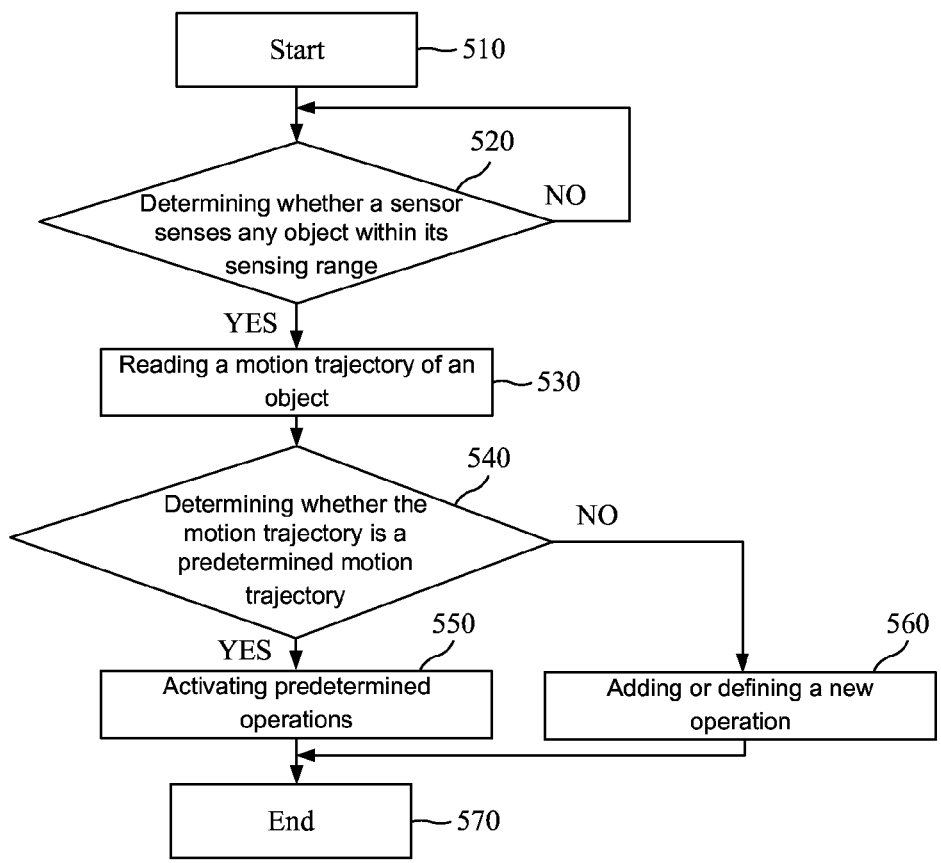
FIG. 4 is a flow diagram illustrating process steps of a method for performing related operations based on motion trajectories according to embodiments of the present disclosure.

FIG. 4 is a flow diagram illustrating process steps of a method for performing related operations based on motion trajectories according to embodiments of the present disclosure. As shown in FIG. 4, firstly, the method starts (step 510). Subsequently, the step 520 is performed to determine whether the sensor senses any object within its sensing range. If it is determined that the sensor senses an object within its sensing range, the step 530 is performed to read the motion trajectory of the object. Subsequently, the present invention may let users define the motion trajectory to generate corresponding operations for the convenience of the present invention. Hence, the step 540 is performed to determine whether the motion trajectory is the predetermined motion trajectory. If it is determined that the motion trajectory is the predetermined motion trajectory, the step 550 is performed to activate the predetermined operation. On the contrary, if it is determined that the motion trajectory is not the predetermined motion trajectory, the step 560 is performed to add or define a new operation. For example, if it is determined that the moving direction of the motion trajectory is clockwise and such motion trajectory is not a predetermined motion trajectory, the step 560 is performed to control the notebook to turn its screen 90 degrees. After the steps 550 and 560 are performed, the method ends (step 570). In addition, in the step 520, if it is determined that the sensor does not sense any object within its sensing range, the step 520 is performed repeatedly. However, the present is not intended to be limited to the embodiment of FIG. 4. The embodiment of FIG. 4 is merely used for illustrative purposes.

Those having skill in the art will appreciate that method 300 for controlling a sensor can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of method 300 for controlling a sensor named after the function thereof is merely used to describe the technology in the embodiment of the present invention in detail, but the present invention is not limited in this regard. Therefore, combining the steps of said method into one step, dividing the steps into several steps, or rearranging the order of the steps is within the scope of the embodiment in the present invention.

In view of the above embodiments of the present disclosure, it is apparent that the application of the present invention has the advantages as follows. Embodiments of the present disclosure provide a method for controlling a sensor to decrease power consumption of portable electrical devices for prolonging service time of portable electrical devices. In addition, the method for controlling a sensor of embodiments of the present invention adaptively adjusts the non-active time and the sleep time based on operation conditions. As such, the power of the sensor is saved further, and the embodiment of the present invention can provide custom power saving mode for users based on the custom of each users. In addition, the present invention may let users define the motion trajectory to generate corresponding operations for the convenience of the present invention. Finally, the present invention can provide a solution to balance "the purpose of saving power" and "the purpose of sensing sensitively and immediately."

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for controlling a sensor, comprising:
   first sensing an object by the sensor for detecting whether the object is within a sensing range of the sensor;
   if said first sensing detects that the object is not within the sensing range, turning the sensor to a non-active mode for a predicted non-active time, including calculating the predicted non-active time based on a predetermined non-active time or a historical non-active time;
   second sensing the object for detecting whether the object is within the sensing range of the sensor during the predicted non-active time;
   if said second sensing detects that the object is within the sensing range of the sensor during the predicted non-active time, turning the sensor to an active mode, and storing a first time duration from the beginning of the predicted non-active time to a first time point that said first sensing detects that the object is within the sensing range of the sensor, wherein the first time duration is regarded as the historical non-active time; and
   if said second sensing detects that the object is not within the sensing range during the predicted non-active time, turning the sensor to a sleep mode for a predicted sleep time, including calculating the predicted sleep time based on the predetermined non-active time and a predetermined sleep time, or calculating the predicted sleep time based on the historical non-active time and a historical sleep time, further comprising:
   third sensing the object by the sensor for detecting whether the object is within the sensing range of the sensor during the predicted sleep time;
   if said third sensing does not detect that the object is within the sensing range of the sensor during the predicted sleep time and the predicted sleep time has been reached, turning the sensor to the active mode; and
   if said third sensing detects before the predicted sleep time has been reached, that the object is within the sensing range of the sensor during the predicted sleep time, turning the sensor to the active mode, and storing a second time duration from the beginning of the predicted sleep time to a second time point that said third sensing detects that the object is within the sensing range of the sensor, wherein the second time duration is regarded as the historical sleep time, wherein
   the predicted non-active time is calculated as sum of the predetermined non-active time and a difference or differences between historical non-active times.

2. The method for controlling a sensor of claim 1, wherein the predicted non-active time is calculated by the following formula:

$$x_n = x_{n-1} + \frac{(x_{n-1} - x_{n-2})}{2}$$

where $x_n$ represents the predicted non-active time, and $x_{n-1}$ and $x_{n-2}$ represent the predetermined non-active time or the historical non-active time.

3. The method for controlling a sensor of claim 2, wherein the predicted sleep time is calculated by the following formula:

$$y_n = (x_{n-1} + y_{n-1}) + \frac{(x_{n-1} + y_{n-1}) - (x_{n-2} + y_{n-2})}{2} - x_n$$

where $y_n$ represents the predicted sleep time, and $y_{n-1}$ and $y_{n-2}$ represent the predetermined sleep time or the historical sleep time.

4. The method for controlling a sensor of claim 1, wherein the predicted non-active time is calculated by the following formula:

$$x_n = x_{n-1} + \frac{(x_{n-1} - x_{n-2})}{2} - \frac{x_{n-1}}{3}$$

where $x_n$ represents the predicted non-active time, and $x_{n-1}$ and $x_{n-2}$ represent the predetermined non-active time or the historical non-active time.

5. The method for controlling a sensor of claim 4, wherein the predicted sleep time is calculated by the following formula:

$$y_n = (x_{n-1} + y_{n-1}) + \frac{(x_{n-1} + y_{n-1}) - (x_{n-2} + y_{n-2})}{2} - x_n$$

where $y_n$ represents the predicted sleep time, and $y_{n-1}$ and $y_{n-2}$ represent the predetermined sleep time or the historical sleep time.

* * * * *